United States Patent
Araki et al.

(10) Patent No.: US 11,358,469 B2
(45) Date of Patent: Jun. 14, 2022

(54) INFORMATION DISPLAY DEVICE, INFORMATION DISPLAY SYSTEM, INFORMATION OUTPUT METHOD, AND CONTROL PROGRAM

(71) Applicant: The Yokohama Rubber Co., LTD., Minato-ku, Tokyo (JP)

(72) Inventors: Yasuhiko Araki, Hiratsuka (JP); Daisuke Kanenari, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/481,809

(22) PCT Filed: Feb. 28, 2018

(86) PCT No.: PCT/JP2018/004487
§ 371 (c)(1),
(2) Date: Jul. 29, 2019

(87) PCT Pub. No.: WO2018/179896
PCT Pub. Date: Oct. 4, 2018

(65) Prior Publication Data
US 2019/0389306 A1 Dec. 26, 2019

(30) Foreign Application Priority Data

Mar. 29, 2017 (JP) .............................. JP2017-066255

(51) Int. Cl.
*B60K 35/00* (2006.01)
*B60C 23/02* (2006.01)
(Continued)

(52) U.S. Cl.
CPC .............. *B60K 35/00* (2013.01); *B60C 23/02* (2013.01); *B60C 23/20* (2013.01);
(Continued)

(58) Field of Classification Search
CPC .............. B60K 35/00; B60K 2370/156; B60K 2370/167; B60K 2370/52; B60K 2370/163; B60C 23/02; B60C 23/20; G01P 1/08
See application file for complete search history.

(56) References Cited

U.S. PATENT DOCUMENTS 6,362,731 B1 * 3/2002 Lill ..................... B60C 23/0483
340/447
6,633,811 B1 * 10/2003 Aumayer ............... B60K 37/02
701/538
(Continued)

FOREIGN PATENT DOCUMENTS

| CN | 105022294 A | 11/2015 | |
|---|---|---|---|
| JP | H10208194 | * 7/1998 | ........... B60G 17/015 |

(Continued)

OTHER PUBLICATIONS

International Search Report for International Application No. PCT/JP2018/004487 dated Apr. 10, 2018, 4 pages, Japan.
(Continued)

*Primary Examiner* — Joseph H Field
*Assistant Examiner* — Rufus C Point
(74) *Attorney, Agent, or Firm* — Thorpe North & Western

(57) ABSTRACT

An information display device includes an information acquisition unit configured to acquire information; a position acquisition unit configured to acquire position information indicating a position of the information display device; a determination unit configured to determine an output mode for the information acquired by the information acquisition unit based on the position information acquired by the position acquisition unit; a conversion unit configured to convert the information acquired by the information acquisition unit based on the output mode determined by the determination unit; and an output unit configured to output
(Continued)

the information converted by the conversion unit based on the output mode determined by the determination unit. The determination unit is configured to determine, as the output mode, a display mode complying with laws and regulations applicable to the position of the information display device based on the position information.

15 Claims, 17 Drawing Sheets

(51) Int. Cl.
*B60C 23/20* (2006.01)
*G01P 1/08* (2006.01)

(52) U.S. Cl.
CPC .. *B60K 2370/156* (2019.05); *B60K 2370/163* (2019.05); *B60K 2370/167* (2019.05); *B60K 2370/52* (2019.05); *G01P 1/08* (2013.01)

(56) References Cited

U.S. PATENT DOCUMENTS

| | | | | |
|---|---|---|---|---|
| 7,573,376 | B2* | 8/2009 | Oshiro | B60C 23/061 340/442 |
| 9,505,502 | B2* | 11/2016 | Miller | B60C 23/0479 |
| 9,511,634 | B2* | 12/2016 | Chan | B60C 23/20 |
| 9,844,983 | B2* | 12/2017 | Chan | B60C 23/002 |
| 10,358,057 | B2* | 7/2019 | Breed | G01S 17/89 |
| 10,366,607 | B2* | 7/2019 | Ahn | G08G 1/0967 |
| 2003/0058089 | A1* | 3/2003 | Ruehr | B60C 23/0408 340/442 |
| 2003/0083075 | A1* | 5/2003 | Miyazaki | H04W 48/18 455/552.1 |
| 2003/0195668 | A1* | 10/2003 | Radtke | H04B 3/548 701/1 |
| 2004/0088135 | A1* | 5/2004 | Fujioka | G01L 17/00 702/138 |
| 2004/0246117 | A1* | 12/2004 | Ogawa | B60C 23/0433 340/445 |
| 2005/0040941 | A1* | 2/2005 | Schofield | B60C 23/0406 340/442 |
| 2005/0097948 | A1* | 5/2005 | Suzuki | B60C 23/0416 73/146 |
| 2006/0001534 | A1* | 1/2006 | Shida | B60C 23/0408 73/146 |
| 2006/0028330 | A1* | 2/2006 | Gallant | B60K 35/00 359/13 |
| 2006/0087419 | A1* | 4/2006 | Peng | B60C 23/0408 701/31.4 |
| 2008/0024287 | A1* | 1/2008 | Boyle | B60C 23/0408 701/31.4 |
| 2008/0133791 | A1* | 6/2008 | Hodges | H04W 4/029 710/33 |
| 2008/0198042 | A1* | 8/2008 | Quigley | G01D 7/02 340/988 |
| 2011/0160954 | A1* | 6/2011 | Yamaguchi | B60C 23/0481 711/E12.001 |
| 2012/0200408 | A1* | 8/2012 | Gotschlich | B60C 23/0416 340/442 |
| 2013/0033716 | A1* | 2/2013 | Suese | G06F 3/04886 358/1.13 |
| 2013/0145834 | A1* | 6/2013 | Mouchet | B60C 23/0479 141/38 |
| 2014/0253311 | A1* | 9/2014 | Yu | B60C 23/0462 340/447 |
| 2014/0309864 | A1* | 10/2014 | Ricci | G09G 5/37 701/36 |
| 2015/0103374 | A1* | 4/2015 | Lee | G06F 3/1204 358/1.15 |
| 2015/0178985 | A1* | 6/2015 | Di Censo | G06T 17/05 345/419 |
| 2016/0121666 | A1* | 5/2016 | Chan | B60C 23/20 137/78.1 |
| 2016/0347130 | A1* | 12/2016 | Chan | B60C 23/002 |
| 2017/0147396 | A1* | 5/2017 | Sekimoto | G06F 16/00 |
| 2018/0134102 | A1* | 5/2018 | Okada | G01P 15/00 |
| 2018/0165959 | A1* | 6/2018 | Leem | B60W 30/14 |
| 2018/0182241 | A1* | 6/2018 | Ahn | B60K 37/02 |
| 2019/0047334 | A1* | 2/2019 | Chidlow | B60C 23/004 |
| 2019/0248281 | A1* | 8/2019 | Fushimi | G05D 1/0088 |
| 2019/0389306 | A1* | 12/2019 | Araki | G08G 1/09 |

FOREIGN PATENT DOCUMENTS

| | | |
|---|---|---|
| JP | H10-208194 | 8/1998 |
| JP | 2007-287083 | 11/2007 |
| JP | 2009-222523 | 10/2009 |
| JP | 2010-061295 | 3/2010 |
| JP | 2015-118438 | 6/2015 |

OTHER PUBLICATIONS

International Search Report for International Application No. PCT/JP2018/004487 dated Apr. 4, 2019, 4 pages, Japan.

\* cited by examiner

| POSITION INFORMATION | COUNTRY NAME |
|---|---|
| N35° 40'52.62"<br>E139° 45'57.93" | JP |
| | |
| ⋮ | ⋮ |
| N40° 41'21.00"<br>W74° 02'40.00" | US |
| ⋮ | ⋮ |

| COUNTRY NAME | UNIT SYSTEM |
|---|---|
| JP | MKS |
|  |  |
| ⋮ | ⋮ |
| US | FPS |
|  |  |

| UNIT SYSTEM | CONVERSION EXPRESSION |
|---|---|
| MKS | (PIS) × 6.895,[(°F)−42]/1.8 |
| FPS | — |
| ⋮ | ⋮ |
| | |
| | |

| POSITION INFORMATION | CONVERSION EXPRESSION |
|---|---|
| N35° 40'52.62"<br>E139° 45'57.93" | ———— |
| ⋮ | |
| N40° 41'21.00"<br>W74° 02'40.00" | (PIS) × 6.895,[(°F)−42]/1.8 |
| | |

221D

INFORMATION DISPLAY DEVICE, INFORMATION DISPLAY SYSTEM, INFORMATION OUTPUT METHOD, AND CONTROL PROGRAM

TECHNICAL FIELD

The present technology relates to an information display device, an information display system, an information output method, and a control program.

BACKGROUND ART

Conventionally, technology is known for changing the various displays of a vehicle to the language of the country in which the vehicle is located or switching display of the speedometer to a mile display or a kilometer display (for example, Japan Unexamined Patent Publication No. H10-208194).

In an information display device, a display or the like complying with laws and regulations needs to be performed, and there is room for improvement in the technology disclosed in Japan Unexamined Patent Publication No. H10-208194.

SUMMARY

The present technology provides an information display device, an information display system, an information output method, and a control program capable of performing information output complying with laws and regulations.

A transportable information display device displaying information, according to an aspect of the present technology includes an information acquisition unit acquiring the information; a position acquisition unit acquiring position information indicating a position of the information display device; a determination unit determining an output mode for the information acquired by the information acquisition unit based on the position information acquired by the position acquisition unit; a conversion unit converting the information acquired by the information acquisition unit based on the output mode determined by the determination unit; and an output unit outputting the information converted by the conversion unit based on the output mode determined by the determination unit; the determination unit determining, as the output mode, a display mode complying with laws and regulations applicable to the position of the information display device, based on the position information.

Preferably, the information includes tire information relating to a tire mounted on a vehicle, and the output unit displays the tire information converted by the conversion unit based on the output mode determined by the determination unit.

Preferably, the laws and regulations are related to measurement, and the output unit displays the tire information converted by the conversion unit such that the tire information complies with the laws and regulations.

Preferably, the information acquisition unit acquires information relating to a position by short-range radio communication from another device, the position acquisition unit defines the information relating to a position acquired by the information acquisition unit as the position information, and the position acquisition unit acquires the position information as long as the information acquisition unit is unable to acquire the information relating to a position.

The information display device may include an operating language storage unit storing operating language information established in the information display device as a language used for operation of the information display device, wherein when the position acquisition unit is unable to acquire the position information, the determination unit determines the output mode of the tire information acquired by the information acquisition unit based on a storage content of the operating language storage unit.

Whether initial setting of the information display device has been performed may be determined; and when initial setting of the information display device has not been performed, a user operation of the information display device may be allowed to establish the position information; and when initial setting of the information display device has already been performed, a user operation of the information display device may not be allowed to establish the position information.

An information display system according to an aspect of the present technology includes:

an onboard device mounted on a vehicle and including a transmission unit transmitting tire information relating to a tire mounted on the vehicle; and an information display device including an information acquisition unit acquiring the tire information from the onboard device;

a position acquisition unit acquiring position information indicating a position of the information display device;

a determination unit determining an output mode for the tire information acquired by the information acquisition unit based on the position information acquired by the position acquisition unit;

a conversion unit converting the tire information based on the output mode determined by the determination unit; and an output unit outputting the tire information converted by the conversion unit based on the output mode determined by the determination unit.

The onboard device may transmit, together with the tire information, position information indicating a position of the onboard device from the transmission unit; and in the information display device, the determination unit may determine an output mode of the tire information based on the position information acquired from the onboard device.

A method of outputting information for a transportable information display device displaying information according to an aspect of the present technology may include the steps of:

acquiring the information;

acquiring position information indicating a position of the information display device;

determining a display mode complying with laws and regulations applicable to the position of the information display device as an output mode for the information acquired in the step of acquiring the information, based on the position information acquired in the step of acquiring position information;

converting the information acquired in the step of acquiring the information, based on the output mode determined in the step of determining; and outputting the information converted in the step of converting based on the output mode determined in the step of determining.

A control program according to an aspect of the present technology for controlling a transportable information display device displaying information is executable to instruct a computer to achieve the functions of: acquiring the information;

acquiring position information indicating a position of the information display device;

determining a display mode complying with laws and regulations applicable to the position of the information display device as an output mode for the information acquired by the function of acquiring the information, based on the position information acquired by the function of acquiring position information;

converting the information acquired by the function of acquiring the information, based on the output mode determined by the function of determining; and outputting the information converted by the function of converting based on the output mode determined by the function of determining.

According to the present technology, a display complying with laws and regulations can be performed by determining a display mode complying with the applicable laws and regulations based on the position information.

BRIEF DESCRIPTION OF DRAWINGS

FIG. 5 is a diagram illustrating an example of a table indicating correspondence between position information and country names.

FIG. 6 is a diagram illustrating an example of a table indicating correspondence between country names and unit systems.

FIG. 7 is a diagram illustrating an example of a table indicating correspondence between unit systems and conversion expressions.

DETAILED DESCRIPTION

Embodiments of the present technology are described in detail below with reference to the drawings. Herein, identical or substantially similar components to those of other embodiments have the same reference signs, and descriptions of those components are either simplified or omitted. However, the present technology is not limited by the embodiments. Constituents of the embodiments include elements that are essentially identical or that can be substituted or easily conceived by one skilled in the art. Furthermore, it is possible to combine the configurations described below as desired. Moreover, various omissions, substitutions, and changes of the configurations can be carried out within the scope of the embodiments.

Information Display System

Figure 1:
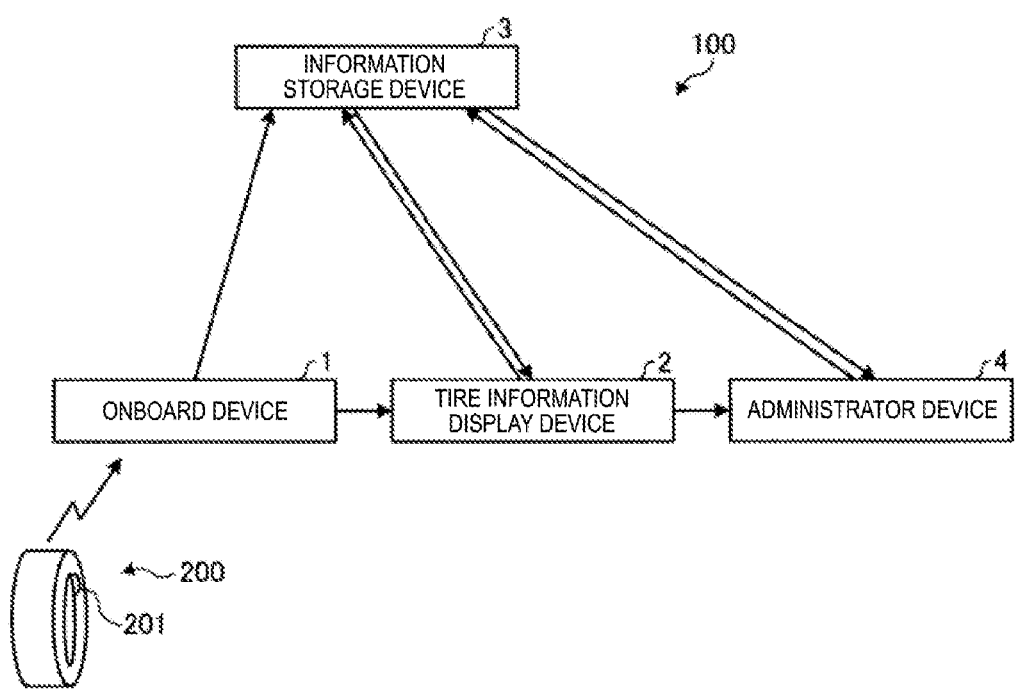
FIG. 1 is a block diagram illustrating a display system according to an embodiment of the present technology.

An information display system according to an embodiment of the present technology will be described. FIG. 1 is a block diagram illustrating the information display system according to an embodiment of the present technology. In FIG. 1, an information display system 100 includes an onboard device 1, a tire information display device 2, an information storage device 3, and an administrator device 4.

The information display system 100 acquires tire information relating to a tire 200 mounted on a vehicle (not illustrated) and provides the acquired tire information to a user. In the present example, the air pressure of the tire 200 and the temperature of the tire 200 are tire information provided to the user. A pneumatic sensor and a temperature sensor are provided on the tire 200. In the present example, a sensor 201 is provided on a valve of the tire 200. The sensor 201 detects the air pressure of the tire 200 and the temperature of the tire 200.

The sensor 201 preferably transmits the air pressure and temperature information of the tire 200, i.e., the tire information along with the identification information of the tire 200 to the onboard device 1. The identification information on the tire 200 is information for identifying the tire 200.

The onboard device 1 is mounted on a vehicle. The onboard device 1 may be an onboard device of a tire pressure monitoring system. The onboard device 1 acquires a measurement value of the air pressure of the tire 200 from the air pressure sensor. The air pressure sensor periodically measures the air pressure of the tire 200. The air pressure sensor measures the air pressure of the tire 200 every other minute, for example.

The onboard device 1 acquires from the temperature sensor a measurement value of the temperature of the tire 200. The temperature sensor periodically measures the temperature of the tire 200. The temperature sensor measures the temperature of the tire 200 every other minute, for example.

The onboard device 1 transmits the measurement information to the tire information display device 2 by Wi-Fi communication, for example. The onboard device 1 transmits the measured information to the information storage device 3 by Wi-Fi communication, for example, via Wi-Fi access points.

For example, the tire information display device 2 is used by the driver of a vehicle on which the tire 200 is mounted. The tire information display device 2 displays tire information or outputs tire information as sound. The tire information display device 2 receives tire information from the onboard device 1 and the information storage device 3. By utilizing the tire information display device 2, the state of the tire 200 mounted on the vehicle being driven can be known. The tire information display device 2 displays the acquired tire information to present the tire information to the user. The tire information display device 2 is preferably a portable device such as a tablet device or a notebook personal computer (PC).

The tire information display device 2 receives information measured by the onboard device 1, for example, via Wi-Fi communication. The tire information display device 2 can communicate information with the information storage device 3 via a network such as, for example, the Internet. As a result, the tire information display device 2 can receive the tire information from also the information storage device 3.

The information storage device 3 is a device used by a company or organization managing tires. The information storage device 3 is, for example, a device used by a company or organization manufacturing or selling tires. The information storage device 3 receives the tire information and stores the received tire information in the information storage device 3. The information storage device 3 receives the tire information via a network such as the Internet or by Wi-Fi communication. The tire information is transmitted from the onboard device 1 and the administrator device 4. By utilizing the information storage device 3, the state of the managed tire can be known.

The administrator device 4 is a device used by a company or organization managing vehicles. The administrator device 4 is, for example, a device used by transportation companies, bus companies, and taxi companies. The administrator device 4 receives the tire information and stores the received tire information in the administrator device 4. The administrator device 4 receives the tire information, for example, via a network such as the Internet. The tire information is transmitted from the tire information display device 2 and the information storage device 3. By utilizing the administrator device 4, the state of the tire being mounted on the managed vehicle can be known.

The administrator device 4 can communicate information with the information storage device 3, for example, via a network such the Internet. Thus, the administrator device 4 can receive the tire information from the information storage device 3.

Onboard Device

Figure 2:
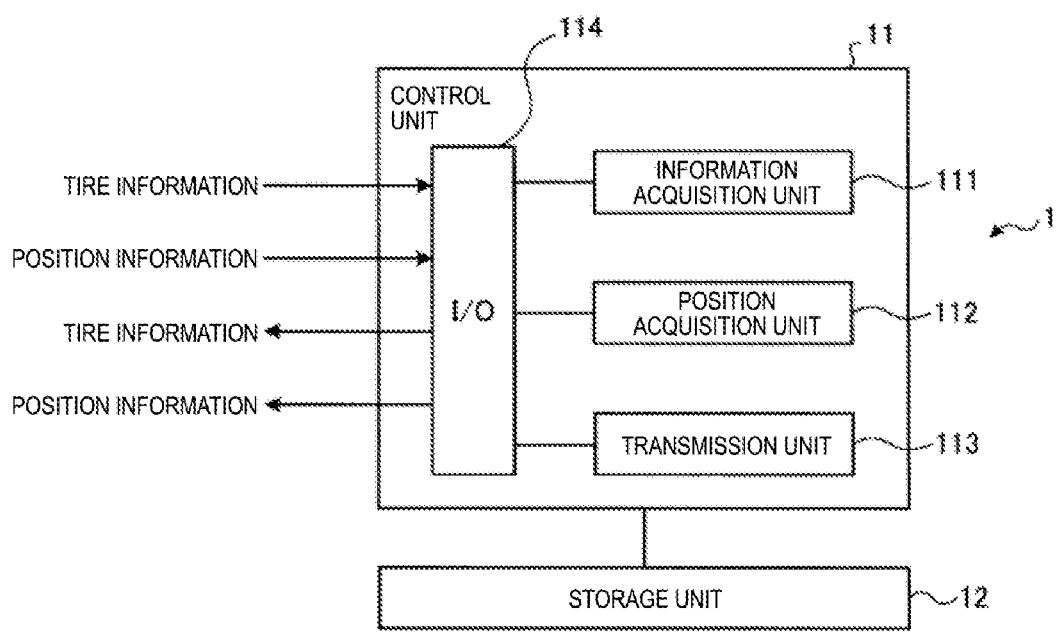
FIG. 2 is a block diagram illustrating an example of functions of an onboard device.

FIG. 2 is a block diagram illustrating an example of functions of the onboard device 1. In FIG. 2, the onboard device 1 includes a control unit 11 and a storage unit 12. The control unit 11 is a device for comprehensively controlling the operation of the onboard device 1 and includes a central processing unit (CPU), a read only memory (ROM), a random-access memory (RAM).

The control unit 11 further includes an information acquisition unit 111, a position acquisition unit 112, a transmission unit 113, and an input/output unit (I/O) 114. Specifically, the CPU of the control unit 11 reads and executes various programs to achieve these functions. The information acquisition unit 111 acquires tire information from the other devices. The tire information acquired by the information acquisition unit 111 is stored in the storage unit 12. The position acquisition unit 112 acquires position information from the other devices. The position information acquired by the position acquisition unit 112 is stored in the storage unit 12. The transmission unit 113 transmits the tire information and the position information stored in the storage unit 12 to the other devices.

The storage unit 12 is a device storing various programs and data used for processing by the control unit 11. The storage unit 12 includes, for example, a non-volatile memory.

The tire information acquired by the information acquisition unit 111 includes at least one of the air pressure information of the tire 200 or the temperature information of the tire 200. The tire information acquired by the information acquisition unit 111 includes tire identification information for identifying the tire from which the tire information has been acquired. The tire information acquired by the information acquisition unit 111 is transmitted from the transmission unit 113 along with the position information acquired by the position acquisition unit 112.

Processing by Onboard Device

Figure 3:
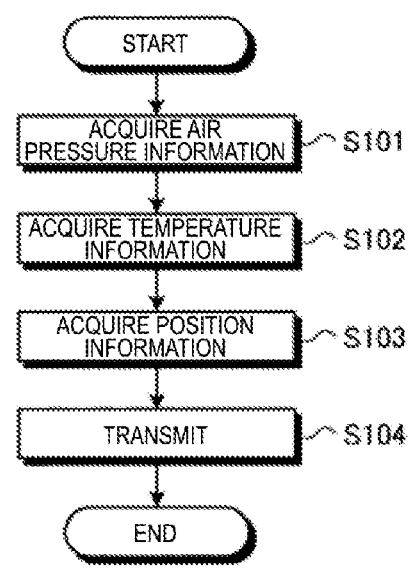
FIG. 3 is a flowchart illustrating an example of processing by a control unit or the like of the onboard device.

Next, processing by the onboard device 1 will be described. FIG. 3 is a flowchart illustrating an example of processing by the control unit 11 and the like of the onboard device 1. As illustrated in FIG. 3, in step S101, the onboard device 1 acquires the air pressure information of the tire 200 by the information acquisition unit 111. In step S102, the onboard device 1 acquires the temperature information of the tire 200 by the information acquisition unit 111. In step S103, the onboard device 1 acquires position information indicating the position of the vehicle on which the tire 200 is mounted by the position acquisition unit 112. In step S104, the onboard device 1 transmits the tire information and the position information to the other devices by the transmission unit 113.

Tire Information Display Device

Figure 4:
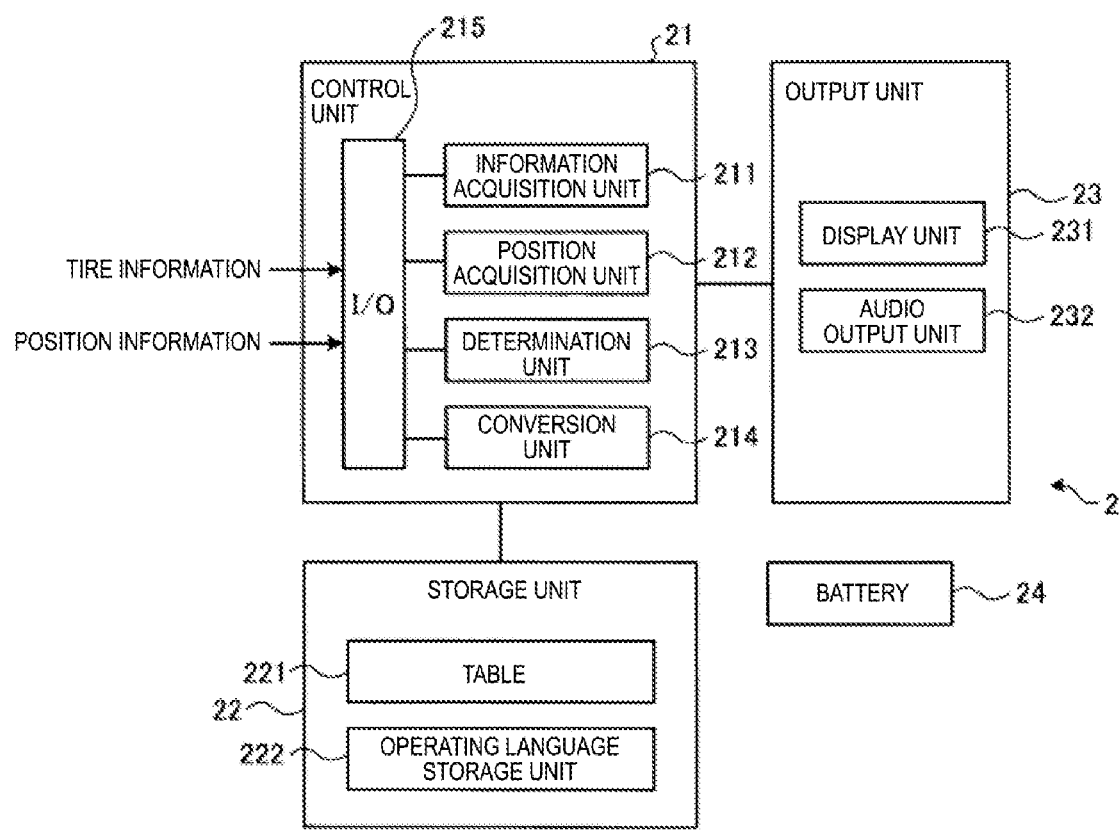
FIG. 4 is a block diagram illustrating an example of functions of the tire information display device.

FIG. 4 is a block diagram illustrating an example of the functions of the tire information display device 2. In FIG. 4, the tire information display device 2 includes a control unit 21, a storage unit 22, an output unit 23, and a battery 24. The control unit 21 is a device for comprehensively controlling the operation of the tire information display device 2 and includes a CPU, a ROM, a RAM (random access memory), and the like, for example. The control unit 21 includes an information acquisition unit 211, a position acquisition unit 212, a determination unit 213, a conversion unit 214, and an input/output unit (I/O) 215. Specifically, the CPU of the control unit 21 reads and executes various programs to achieve these functions. The program includes an application program dedicated to the tire information display device 2, for example.

The information acquisition unit 211 acquires the air pressure information of the tire 200 and the temperature information of the tire 200. The information acquisition unit 211 acquires the air pressure information and the temperature information transmitted by the onboard device 1.

The position acquisition unit 212 utilizes, for example, a global positioning system (GPS) to acquire position information relating to the current position of the tire information display device 2. The GPS receives radio waves from satellites to detect the current position (latitude, longitude, altitude) of the tire information display device 2. The current position of the tire information display device 2 may also be acquired by an assisted GPS (AGPS) utilizing signals from cellular phone base stations. Furthermore, the position information may be acquired using Wi-Fi radio waves. Differential GPS (DGPS), which utilizes error information of a GPS supplied by FM multiplex broadcasting or the like and increases the accuracy of position detection, may be used. Note that the position acquisition unit 212 may acquire the position information from another external device. For example, the position acquisition unit 212 may acquire the position information transmitted by the onboard device 1 as the position information of the tire information display device 2.

The determination unit 213 determines an output mode of the tire information acquired by the information acquisition unit 211 on the basis of the position information acquired by the position acquisition unit 212. The conversion unit 214 converts the information acquired by the information acquisition unit 211 on the basis of the output mode determined by the determination unit 213.

The storage unit 22 includes a table 221 and an operating language storage unit 222. The table 221 is referenced by the determination unit 213 and the conversion unit 214. The operating language storage unit 222 stores the operating language set by the user during the initial setting of the tire information display device 2. The operating language is a language used for display and audio output in the tire information display device 2.

The output unit 23 includes a display unit 231 and an audio output unit 232. The display unit 231 displays tire information received by the information acquisition unit 211 and the like. The display unit 231 includes, for example, a liquid crystal monitor. The display unit 231 may be integrated with a touch panel for receiving information. The audio output unit 232 outputs sound related to the tire information and the like. The audio output unit 232 is a speaker, for example.

The battery 24 supplies power to the components of the tire information display device 2. The battery 24 is rechargeable. The battery 24 is charged by the tire information display device 2 being connected to a commercial power supply via a cable (not illustrated).

Table of Tire Information Display Device

Figure 6:
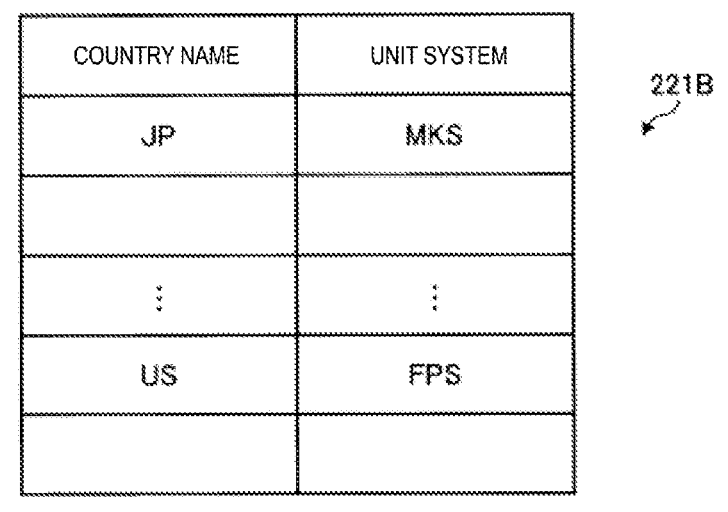

FIGS. 5 to 7 are diagrams illustrating examples of the table 221 stored in the storage unit 22. The table 221 may include a plurality of tables 221A, 221B, and 221C. FIG. 5 is a diagram illustrating an example of the table 221A indicating correspondence between position information and country names. The table 221A is a table for converting the position information acquired by the position acquisition unit 212 into a country name to which the position in the position information belongs to. Note that, in FIGS. 5 and 6, the country names include names of local public organizations, names of regions, names of states, and the like, such as the municipalities of Japan.

For example, the position information [N35° 40' 52.62", E139° 45' 57.93"] is associated with "JP" (Japan). For example, the position information [N40° 41' 21.00", W74° 02' 40.00"] is associated with "US" (USA).

FIG. 6 is a diagram illustrating an example of the table 221B illustrating a correspondence between country names and unit systems. The table 221B is a table for converting country names into unit systems defined by laws and regulations in the country. Referring to the table 221B, "MKS" unit system corresponds to "JP" (Japan), and the "FPS" unit system corresponds to "US" (USA).

FIG. 7 is a diagram illustrating an example of the table 221C illustrating a correspondence between unit systems and conversion expressions. The table 221C is a table for converting the tire information into conversion expressions for conversion to a unit system. For example, if the air pressure unit [PIS] of the "FPS" unit system is converted to the air pressure unit [KPa] of the "MKS" unit system, the value of the air pressure of the "FPS" unit system may be multiplied by 6.895. Also, for example, if the temperature unit [° F.] of the "FPS" unit system is converted to the temperature unit [° C.] of the "MKS" unit system, "42" may be subtracted from the temperature value of the "FPS" unit system with the result being divided by the "1.8". Note that if the weight unit [lb] of the "FPS" unit system is converted to the weight unit [kg] of the "MKS" unit system, the weight value of the "FPS" unit may be multiplied by "0.4536".

Processing by Tire Information Display Device

Figure 8:
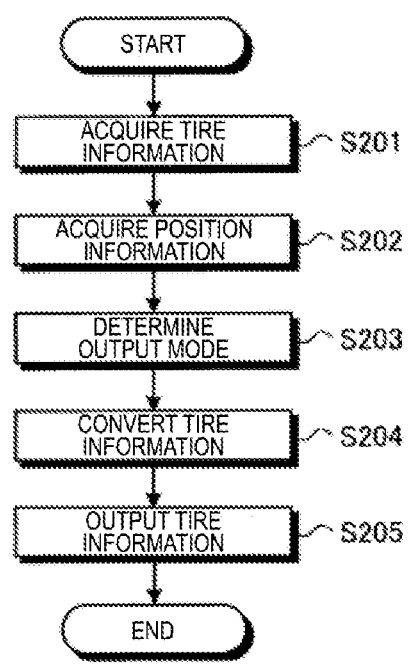
FIG. 8 is a flowchart illustrating an example of processing performed by a control unit or the like of a tire information display device.

Next, processing by the tire information display device 2 will be described. FIG. 8 is a flowchart illustrating an example of processing performed by the control unit 21 of the tire information display device 2.

As illustrated in FIG. 8, in step S201, the tire information display device 2 acquires the tire information by the information acquisition unit 211. In step S202, the tire information display device 2 acquires the position information by the position acquisition unit 212. In step S203, the tire information display device 2 references the table 221 by the determination unit 213 to determine an output mode of the tire information. The determination unit 213 determines a display mode complying with laws and regulations applicable to the position of the tire information display device 2 as the output mode of the tire information.

In step S204, the tire information is converted by the conversion unit 214 on the basis of the determined output mode. In step S205, the converted tire information is output by the output unit 23. By processing in this manner, the tire information can be output in a mode complying with laws and regulations on the basis of position information.

For example, output modes, such as metering units, languages, methods of use, colors, sounds, currency, and the like, complying with laws and regulations can be implemented based on position information. If a mode complying with laws and regulations can be achieved, it is not necessary to provide a device for each destination, and a common device can be provided regardless of the destination, which makes it possible to reduce costs. Furthermore, the user of the tire information display device 2 can establish an output mode such as a display, complying with the laws and regulations of the destination, without much time and effort on settings tailored to the country or region in which the tire information display device 2 is to be used. By changing the output mode of the tire information display device 2 on the basis of the position information, it is possible to reduce the time and effort to switch display and prevent forgetting to switch the display. Furthermore, an environment that enables compliance with laws and regulations can be provided through an output mode complying with the laws and regulations of the current locations even when the vehicle moves across multiple countries.

Note that the processing of the flowchart illustrated in FIG. 8 starts when the tire information display device 2 is activated and is periodically executed by the tire information display device 2. In a case where the application program performs the processing of the flowchart illustrated in FIG. 8, the processing may begin at the time of download or installation of the application program, or the process may begin upon the startup of the application program.

Information Storage Device

Figure 9:
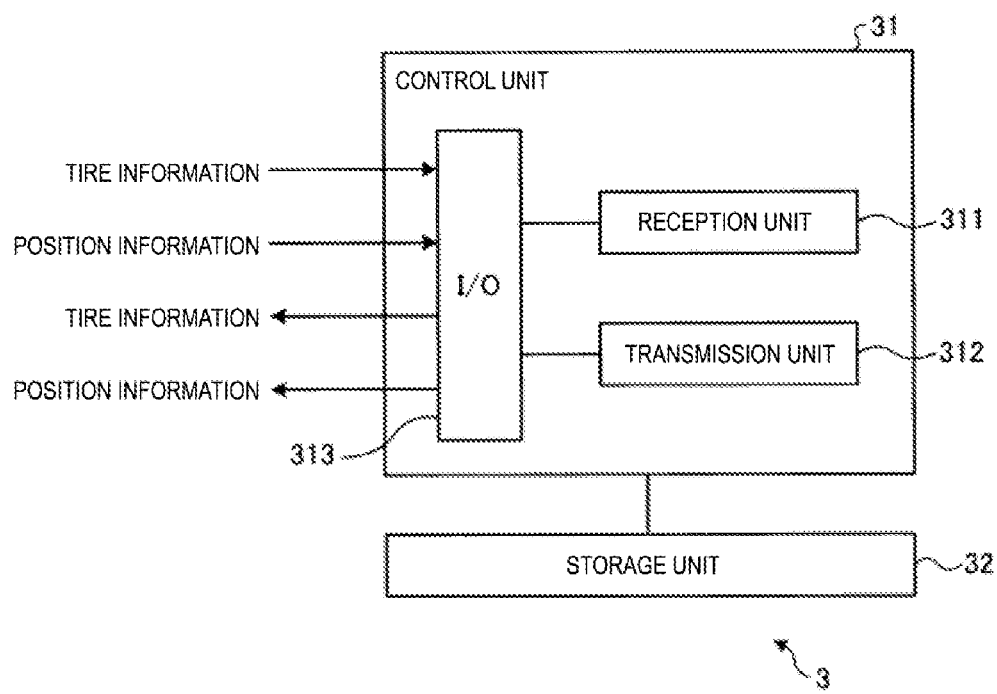
FIG. 9 is a block diagram illustrating an example of functions of an information storage device.

FIG. 9 is a block diagram illustrating an example of the functions of the information storage device 3. In FIG. 9, the information storage device 3 includes a control unit 31 and a storage unit 32. The control unit 31 is a device for comprehensively controlling the operation of the information storage device 3 and includes, for example, a CPU, a ROM, a RAM, and the like. The control unit 31 includes a reception unit 311, a transmission unit 312, and an input/output unit (I/O) 313. Specifically, the CPU of the control unit 31 reads and executes various programs to achieve these functions. The reception unit 311 receives tire information and position information. The transmission unit 312 transmits the tire information and the position information. The storage unit 32 includes, for example, a non-volatile memory or a magnetic storage device. The storage unit 32 stores the tire information and the position information received by the reception unit 311.

Processing by Information Storage Device

Figure 10:
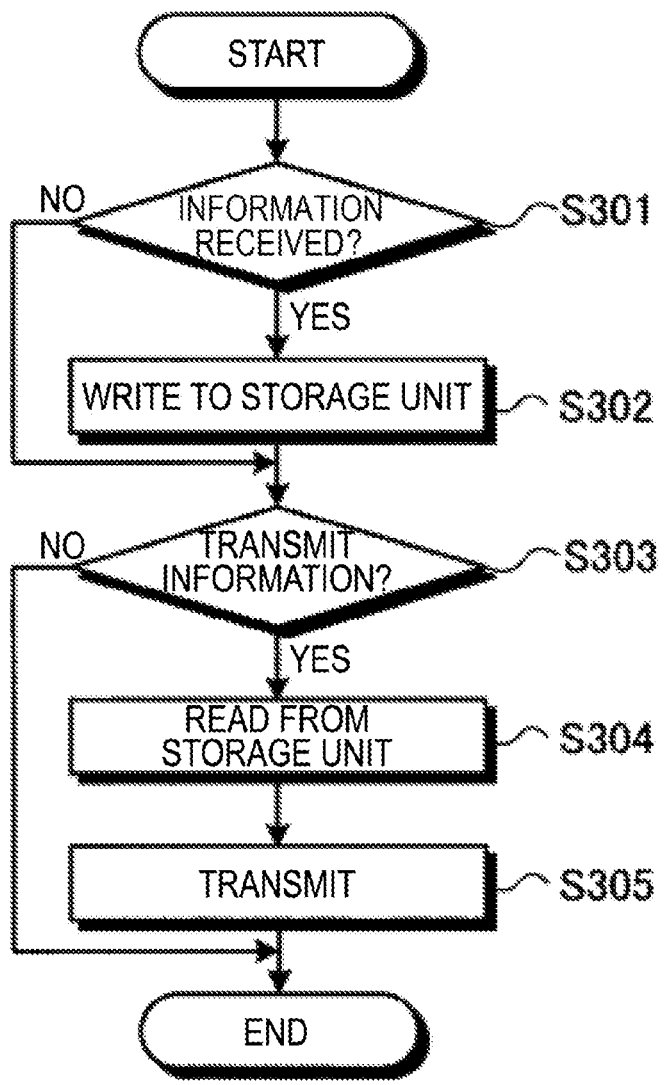
FIG. 10 is a flowchart illustrating an example of processing performed by a control unit or the like of the information storage device.

Next, processing by the information storage device 3 will be described. FIG. 10 is a flowchart illustrating an example of processing by the control unit 31 or the like of the information storage device 3. As illustrated in FIG. 10, in step S301, the information storage device 3 determines whether the reception unit 311 has received the tire information and the position information. As a result of the determination in step S301, if the reception unit 311 has received the tire information and the position information (Yes in step S301), the information storage device 3 writes the tire information to the storage unit 32 in step S302.

In step S303, the information storage device 3 determines whether the transmission unit 312 transmits the tire information and the position information. As a result of the determination in step S303, if the transmission unit 312 transmits the tire information and the position information (Yes in step S303), the information storage device 3 reads the tire information from the storage unit 32 in step S304. In step S305, the information storage device 3 transmits the tire information and the position information from the transmission unit 312.

Note that, as a result of the determination in step S301, if the reception unit 311 does not receive the tire information (No in step S301), the information storage device 3 determines step S303. As a result of the determination in step S303, if the transmission unit 312 does not transmit the tire information (No in step S303), the information storage device 3 ends the processing.

Administrator Device

Figure 11:
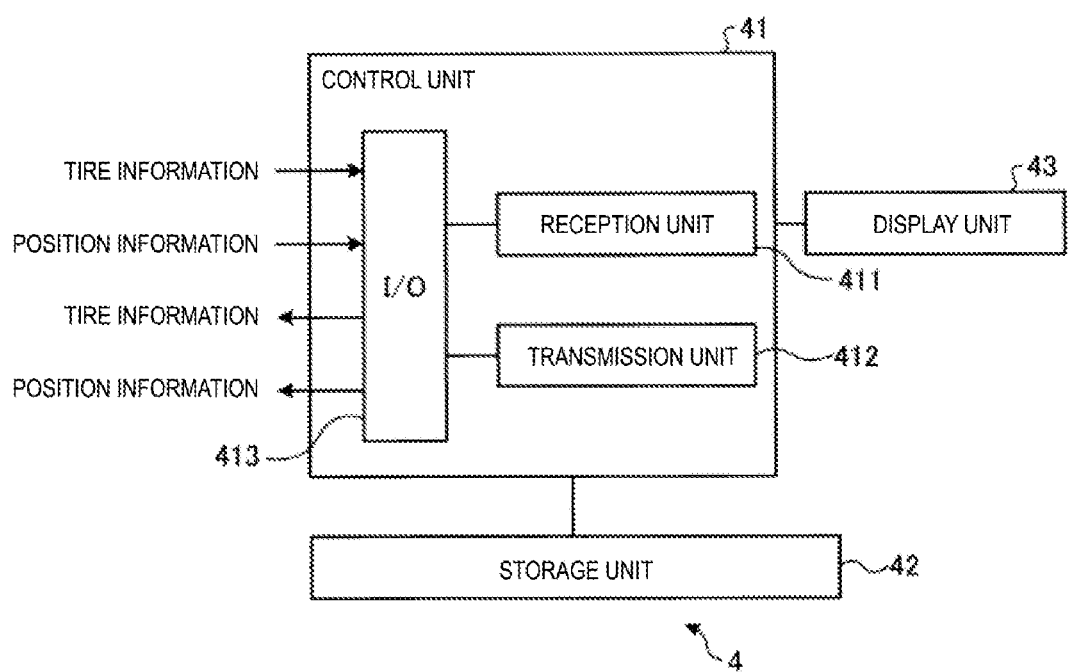
FIG. 11 is a block diagram illustrating an example of a function of an administrator device.

FIG. 11 is a block diagram illustrating an example of the functions of the administrator device 4. In FIG. 11, the administrator device 4 includes a control unit 41, a storage unit 42, and a display unit 43. The control unit 41 is a device for comprehensively controlling the operation of the administrator device 4, and includes, for example a CPU, a ROM, a RAM, and the like. The control unit 41 includes a reception unit 411, a transmission unit 412, and an input/output unit (I/O) 413. Specifically, the CPU of the control unit 41 reads and executes various programs to achieve these functions. The reception unit 411 receives tire information and position information. The transmission unit 412 transmits the tire information and the position information. The storage unit 42 includes, for example, a non-volatile memory or a magnetic storage device. The storage unit 42 stores the tire information and the position information received by the reception unit 411.

Processing by Administrator Device

Figure 12:
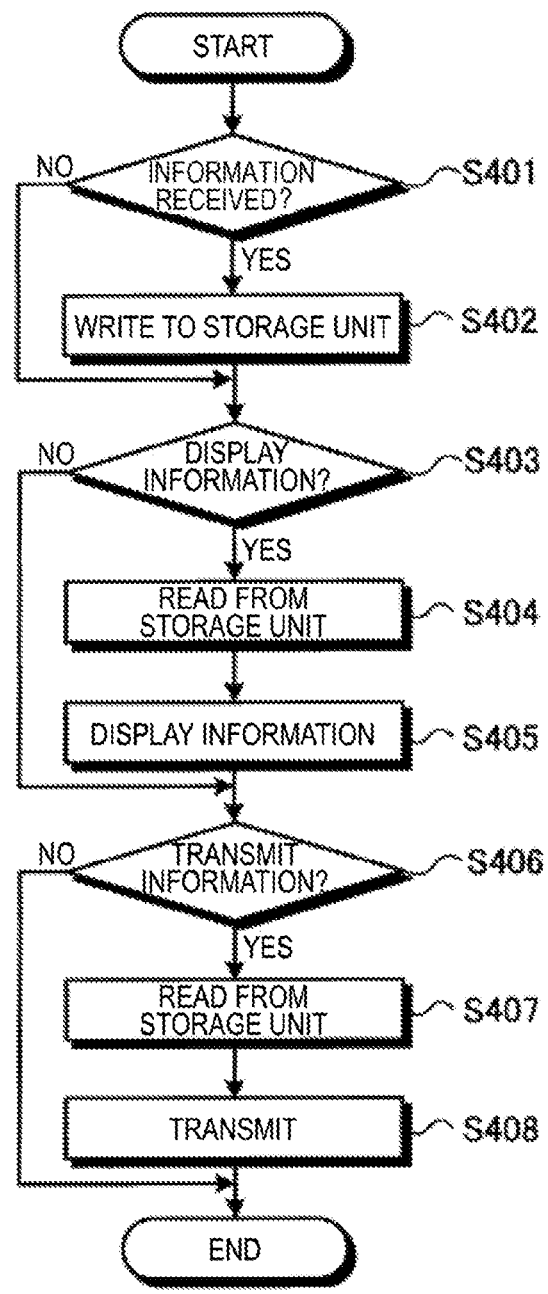
FIG. 12 is a flowchart illustrating an example of processing performed by a control unit or the like of the administrator device.

Next, processing by the administrator device 4 will be described. FIG. 12 is a flowchart illustrating an example of processing by the control unit 41 and the like of the administrator device 4. As illustrated in FIG. 12, in step S401, the administrator device 4 determines whether the reception unit 411 has received the tire information and the position information. As a result of the determination in step S401, if the reception unit 411 has received the tire information and the position information (Yes in step S401), the administrator device 4 writes the tire information to the storage unit 42 in step S402.

In step S403, the administrator device 4 determines whether the tire information and the position information are displayed by the display unit 43. As a result of the determination in step S403, if the tire information and the position information are displayed by the display unit 43 (Yes in step S403), the administrator device 4 reads the tire information and the position information from the storage unit 42 in step S404. In step S405, the administrator device 4 displays the read tire information by the display unit 43.

In step S406, the administrator device 4 determines whether the transmission unit 412 transmits the tire information and the position information. As a result of the determination in step S406, if the transmission unit 412 transmits the tire information and the position information (Yes in step S406), the administrator device 4 reads the tire information and the position information from the storage unit 42 in step S407. The administrator device 4 transmits the read tire information by the transmission unit 412 in step S408.

Note that, as a result of the determination in step S401, if the reception unit 411 has not received tire information and position information (No in step S401), the administrator device 4 makes a determination in step S403. Furthermore, as a result of the determination in step S403, if the tire information and the position information are not displayed by the display unit 43 (No in step S403), the administrator device 4 makes a determination in step S406. As a result of the determination in step S406, if the transmission unit 412 does not transmit the tire information and the position information (No in step S406), the administrator device 4 ends the processing.

Information Output Method

As described with reference to FIG. 8, in the tire information display device 2, the following method of outputting information is employed. In specific, the method of outputting information for a transportable information display device displaying information includes the steps of acquiring the information (step S201); acquiring position information indicating a position of the information display device (step S202); determining a display mode complying with laws and regulations applicable to the position of the information display device as an output mode for the information acquired in the step of acquiring the information (step S201), based on the position information acquired in the step of acquiring position information (step S202) (step S203); converting the information acquired in the step of acquiring the information (step S201), based on the output mode determined in the determining step (step S203) (step S204); and outputting the information converted in the step of converting (step S204) based on the output mode determined in the step of determining (step S203) (step S205). According to the information output method, an output mode complying with the applicable laws and regulations can be determined on the basis of the position information, and information output complying with the laws and regulations can be performed.

Control Program

In the tire information display device 2 described above, the CPU of the control unit 21 reads and executes the application program to achieve the functions of the information acquisition unit 211, the position acquisition unit 212, the determination unit 213, the conversion unit 214, and the input/output unit (I/O) 215. The application program is a control program for controlling a transportable information display device displaying information, the control program being executed to instruct a computer to achieve the functions of: acquiring the information; acquiring position information indicating a position of the information display device; determining a display mode complying with laws and regulations applicable to the position of the information display device as an output mode for the information acquired by the function of acquiring the information, based on the position information acquired by the function of acquiring position information; converting the information acquired by the function of acquiring the information, based on the output mode determined by the function of determining; and outputting the information converted by the function of converting based on the output mode determined by the function of determining. The application program may be downloaded from a predetermined Web site and installed on the tire information display device 2 or may be preloaded to the tire information display device 2 before the tire information display device 2 is shipped. By executing such a control program, an output mode complying with the applicable laws and regulations can be determined on the basis of the position information and information output complying with the laws can be performed.

Modified Example 1

Figure 13:
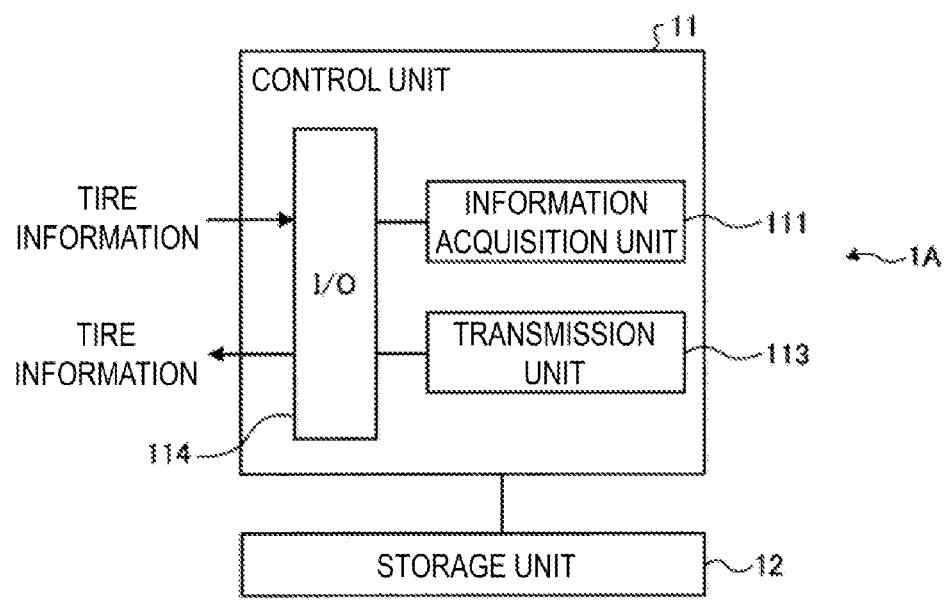
FIG. 13 is a block diagram illustrating a function of a modified example of the onboard device.

In the example described above, the case of transmitting the position information together with the tire information from the onboard device 1 to the tire information display device 2 has been described. Alternatively, only the tire information may be transmitted from the onboard device, and the position information may be acquired using a GPS or the like in the tire information display device 2. FIG. 13 is a block diagram illustrating functions of a modified example of the onboard device. The onboard device 1A illustrated in FIG. 13 does not include a position acquisition unit, unlike the onboard device 1 illustrated in FIG. 2.

Figure 14:
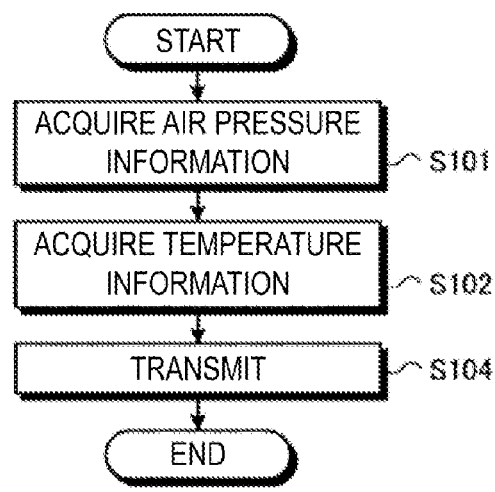
FIG. 14 is a flowchart illustrating an example of processing performed by a control unit or the like of the onboard device of FIG. 13.

Next, processing by the onboard device 1A will be described. FIG. 14 is a flowchart illustrating an example of processing by the control unit 11 of the onboard device 1A illustrated in FIG. 13. As illustrated in FIG. 14, in step S101, the onboard device 1A acquires air pressure information of the tire 200 by the information acquisition unit 111. In step S102, the onboard device 1A acquires the temperature information of the tire 200 by the information acquisition unit 111. In step S104, the onboard device 1A transmits the tire information to other devices by the transmission unit 113.

Second Modified Example

Figure 15:
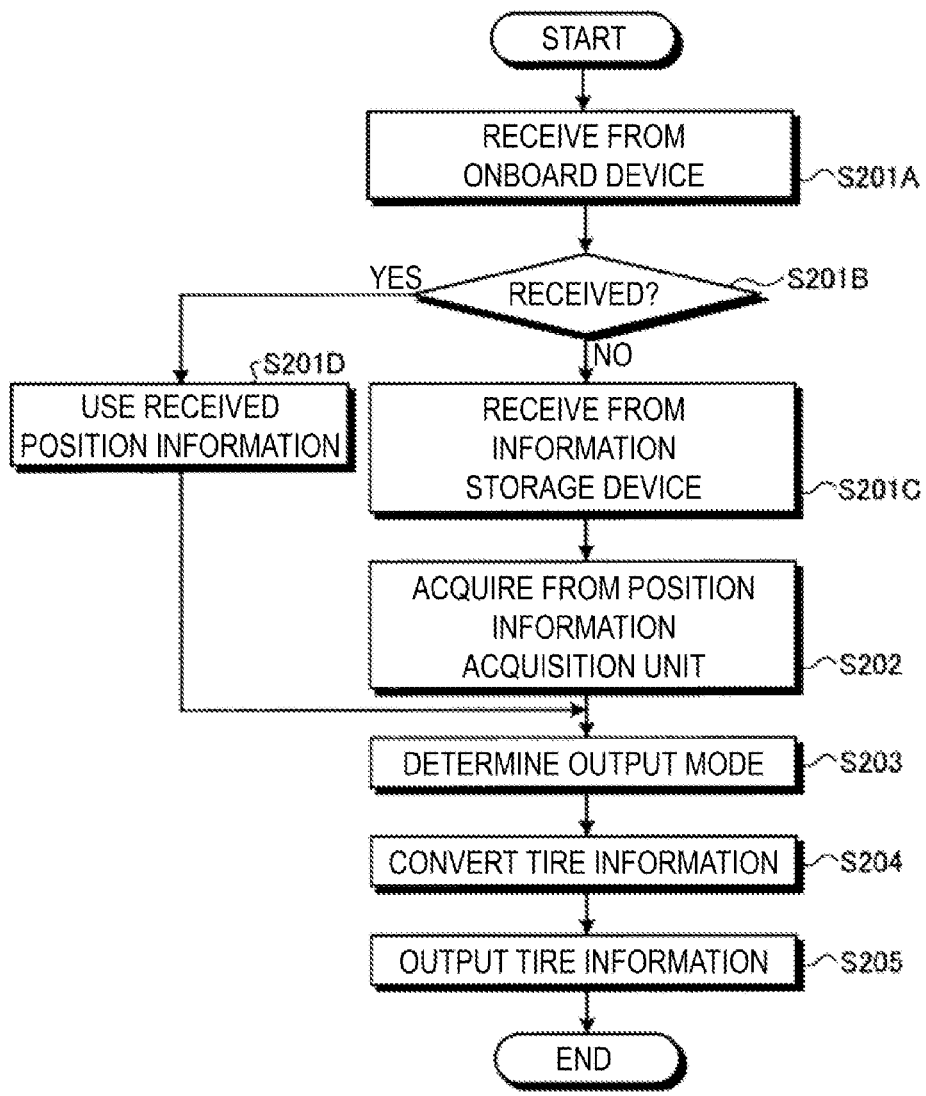
FIG. 15 is a flowchart illustrating an example of processing of the tire information display device in a case where tire information and position information are transmitted by short-range radio communication from the onboard device.

The onboard device 1 may transmit tire information and position information by short-range radio communication. The onboard device 1 can, for example, use near field communication (NFC), Bluetooth (registered trademark), Wi-Fi, and the like as a short-range radio communication. Thus, when the onboard device 1 and the tire information display device 2 are positioned close together, the tire information display device 2 can acquire the tire information and the position information from the onboard device 1. In other words, in a case where the tire information and the position information can be acquired from the onboard device 1, the tire information display device 2 may presume the position of the onboard device 1 as the position of the tire information display device 2, and determine the output mode on the basis of the position information acquired from the onboard device 1. When the tire information display device 2 is of a portable type and the onboard device 1 and the tire information display device 2 are positioned apart from each other, the tire information display device 2 may not be able to acquire the tire information and the position information from the onboard device 1 via short-range radio communication. The processing of the tire information display device 2 in this case will be described. FIG. 15 is a flowchart illustrating an example of processing of the tire information display device 2 in the case where the tire information and the position information are transmitted via short-range radio communication from the onboard device 1.

As illustrated in FIG. 15, in step S201A, the tire information display device 2 attempts to receive the tire information and the position information from the onboard device 1 via short-range radio communication. In step S201B, the tire information display device 2 determines whether the information acquisition unit 111 has successfully received tire information and position information.

As a result of the determination in step S201B, if the information acquisition unit 111 fails to successfully receive the tire information and the position information (No in step S201B), the tire information display device 2 receives the tire information from the information storage device 3 by the information acquisition unit 111 in step S201C. In step S202, the tire information display device 2 acquires the position information by the position acquisition unit 212. At this time, the position acquisition unit 212 acquires the position information using a GPS or the like, for example.

In step S203, the tire information display device 2 references the table 221 with the determination unit 213 to determine an output mode of the tire information. The determination unit 213 determines a display mode complying with laws and regulations applicable to the position of the tire information display device 2 as the output mode of the tire information. The process after Step S203 is similar to the process described with reference to FIG. 8.

As a result of the determination in step S201B, if the information acquisition unit 111 is able to successfully receive the tire information and the position information (Yes in step S201B), the tire information display device 2 uses the position information received by the information acquisition unit 111 in step S201D and executes the processing of step S203. The process after step S203 is similar to the process described with reference to FIG. 8.

If the position information can be successfully received via the short-range radio communication from the onboard device 1 by performing the processing described above, the process of acquiring the position information in the tire information display device 2 is not performed, so the power consumption of the battery 24 of the tire information display device 2 can be suppressed. In particular, when the position acquisition unit 212 acquires position information using a GPS, the power consumption can be greatly suppressed by preventing the process of acquiring the position information. If the position information cannot be successfully acquired via the short-range radio communication from the onboard device 1, the onboard device 1 and the tire information display device 2 are presumed to be positioned apart from each other. Thus, in such a case, processing for determining the distance between the onboard device 1 and the tire information display device 2 is unnecessary, and the position information can be acquired using a GPS or the like.

Third Modified Example

In the tire information display device 2, the position information may not be acquired by the position acquisition unit 212 due to the deterioration of the radio wave condition. In such a case, the output mode of the tire information acquired by the information acquisition unit 211 may be determined on the basis of the stored content of the operating language storage unit 222. In other words, upon initial setting of the tire information display device 2, a region corresponding to the set operating language may be tentatively regarded as the region of use based on the operating language set by the user, and the output mode of the tire information may be determined. For example, in the case where "Japanese" is stored in the operating language storage unit 222 as the operating language, an output mode for Japan may be established, and in the case where "English (USA)" is stored in the operating language storage unit 222 as the operating language, the output mode for the United States may be established. If the radio wave condition is improved and the position information can be acquired by the position acquisition unit 212, the output mode may be determined in accordance with the position information at the acquired time.

Fourth Modified Example

In the tire information display device 2, it is not preferable to be able to freely modify the setting of the position information of the tire information display device 2 through a user operation, in order to achieve a display complying with laws and regulations. This is because, when the setting of the position information is modified through an user operation, the display may be performed in a display mode not complying with the laws and regulations. For example, a display in accordance with a specification of the United States may be performed in Japan. Thus, by not allowing the position information to be set by a user operation, a display complying with the laws and regulations can always be achieved on the basis of the position information.

However, it is inconvenient to allow no user operation to set the position information. A solution for eliminating such inconvenience may be, for example, allowing an initial setting of position information through a user operation in the tire information display device 2.

Figure 16:
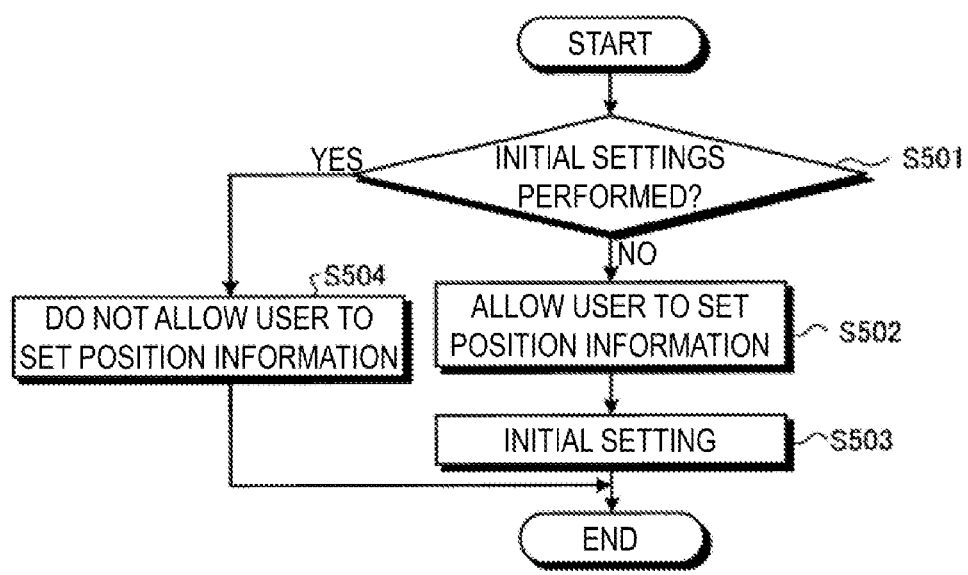
FIG. 16 is a flowchart illustrating a process in a case where the configuration of the position information is allowed by a user operation.

FIG. 16 is a flowchart illustrating the processing for when setting of the position information through a user operation is allowed. As illustrated in FIG. 16, in step S501, it is determined whether an initial setting has already been performed for the tire information display device 2. As a result of the determination in step S501, if the initial setting has not been performed for the tire information display device 2 (No in step S501), the tire information display device 2 allows the setting of position information through a user operation in step S502. Subsequently, in step S503, the initial setting in the tire information display device 2 is performed that includes the setting of the position information through the user operation.

As a result of the determination in step S501, if the initial setting has already been performed for the tire information display device 2 (Yes in step S501), the tire information display device 2 does not allow the setting of the position information through the user operation in step S504. By the process described above, as long as necessary, the setting of the position information through a user operation can be allowed, and a display complying with laws and regulations can be performed in the tire information display device 2.

Modified Example 5

Figure 17:
FIG. 17 is a diagram illustrating an example of a table associating position information and conversion expressions.

In the tire information display device 2, a table that directly associates the position information to the conversion expressions may be employed. FIG. 17 is a diagram illustrating an example of a table associating position information and conversion expressions. For example, in place of the tables 221A, 221B, and 221C described with reference to FIGS. 5 to 7, a table 221D illustrated in FIG. 17 may be used. By using the table 221D illustrated in FIG. 17, position information can be directly converted into a conversion expression without conversion to a country name or unit system, thereby reducing the processing time. Note that, in FIG. 17, the country names include names of local public organizations, names of regions, names of states, and the like, such as the municipalities of Japan.

Sixth Modified Example

While an information display system for displaying tire information has been described above, an output mode complying with laws and regulation can be employed for various types of information without limitation to the tire information. For example, the tire information display device 2 can be applied to a system for the traffic control of vehicles traveling across countries and regions. In this case, an output mode that complies with the laws and regulations of the country or region of the destination can be employed when displaying information necessary for the traffic control of vehicles, for example, speed limits, display language, labor time, and the like.

Seventh Modified Example

For example, the tire information display device 2 can be used as an information display device that displays customer information, and an output mode complying which laws and regulations for protecting personal information can be employed. As a result, personal information is not displayed in countries and regions that prohibit the display of personal information, and personal information can be displayed in countries and regions that do not prohibit such a display.

Eighth Modified Example

The tire information display device 2 described above can be used as an information display device for displaying management information of tires and may perform a display appropriate for laws and regulations of each region. For example, an output mode that complies with the laws and regulations of each country or region may be employed for the tire type, the brand, the manufacturer, the specified air pressure, the inventory management information, the usage history of the tire alone, and the like. The usage history of the tire alone is, for example, air pressure, temperature, the number of retreading, mounting position on the vehicle, and traveling distance.

Ninth Modified Example

The tire information display device 2 can be used as an information display device that displays the sales management information of the tires, and an output mode complying with laws and regulations for each country or region can be employed. For example, an output mode that complies with laws and regulations of each country or region may be employed for the number of tire sales, the sales amount (local currency), the demand prediction, and the like.

Tenth Modified Example

Furthermore, in the tire information display device 2, the position of the driver's seat, i.e., right- or left-hand, of the vehicle can be determined on the basis of the position information, and the display content can be determined. For example, the position of the button displayed on the touch panel can be determined on the basis of the position information. However, because the position of the driver's seat is not changed even when the vehicle is transported across countries and regions, a message prompting confirmation and manual setting is preferably displayed or output as a voice guide. For example, a message such as "if the display is inconvenient, please set manually" is preferably displayed or output as audio.

SUMMARY

As described above, by acquiring the position information indicating the position of the tire information display device 2 to determine the output mode, it is possible to provide a mechanism for displaying information complying with the destination, in common hardware or software that is compatible with any destination. Particularly in Japan, units associated with legal metrological units are defined by the Measurement Act. Thus, if units other than units defined by the Measurement Act are displayed, the vendor will be violating Article 9 of the Measurement Act. For this reason, the vendor is obligated to provide a mechanism for which the user cannot select units other than the legal metrological units. As described above, by automatically switching out the output modes in countries and regions where the legal metrological units used are different, user can avoid confusion in the destination country or region.

The invention claimed is:

1. A transportable information display device configured to display information, comprising:
   an information acquisition unit configured to acquire the information;
   a position acquisition unit configured to acquire position information indicating a position of the information display device;
   a determination unit configured to determine an output mode for the information acquired by the information acquisition unit based on the position information acquired by the position acquisition unit;
   a conversion unit configured to convert the information acquired by the information acquisition unit based on the output mode determined by the determination unit; and
   an output unit configured to output the information converted by the conversion unit based on the output mode determined by the determination unit;
   the determination unit being further configured to determine, as the output mode, a display mode complying with laws and regulations applicable to the position of the information display device, based on the position information; wherein
   the information comprises tire information relating to a tire mounted on a vehicle, and
   the output unit displays the tire information converted by the conversion unit based on the output mode determined by the determination unit.

2. The information display device according to claim 1, wherein the laws and regulations are related to measurement, and the output unit is configured to display the tire information converted by the conversion unit such that the tire information complies with the laws and regulations.

3. The information display device according to claim 1, wherein
   the information acquisition unit is configured to acquire information relating to a position by short-range radio communication from another device,
   the position acquisition unit is configured to define the information relating to a position acquired by the information acquisition unit as the position information, and
   the position acquisition unit is configured to acquire the position information as long as the information acquisition unit is unable to acquire the information relating to a position.

4. The information display device according to claim 1, further comprising:
   an operating language storage unit configured to store operating language information established in the information display device as a language used for operation of the information display device,
   wherein when the position acquisition unit is unable to acquire the position information, the determination unit is configured to determine the output mode of the tire information acquired by the information acquisition unit based on a storage content of the operating language storage unit.

5. The information display device according to claim 1, configured to determine whether initial setting of the information display device has been performed; wherein
   when initial setting of the information display device has not been performed, a user operation of the information display device is allowed to establish the position information; and
   when initial setting of the information display device has already been performed, a user operation of the information display device is not allowed to establish the position information.

6. An information display system, comprising:
   an onboard device mounted on a vehicle and comprising a transmission unit configured to transmit tire information relating to a tire mounted on the vehicle; and
   an information display device comprising:
      an information acquisition unit configured to acquire the tire information from the onboard device;
      a position acquisition unit configured to acquire position information indicating a position of the information display device;
      a determination unit configured to determine an output mode for the tire information acquired by the information acquisition unit based on the position information acquired by the position acquisition unit;
      a conversion unit configured to convert the tire information based on the output mode determined by the determination unit; and
      an output unit configured to output the tire information converted by the conversion unit based on the output mode determined by the determination unit.

7. The information display system according to claim 6, wherein
   the onboard device is configured to transmit, together with the tire information, position information indicating a position of the onboard device from the transmission unit; and
   in the information display device, the determination unit is configured to determine an output mode of the tire information based on the position information acquired from the onboard device.

8. A method of outputting information for a transportable information display device displaying information, the method comprising the steps of:
   acquiring the information comprising tire information relating to a tire mounted on a vehicle;

acquiring position information indicating a position of the information display device;

determining a display mode complying with laws and regulations applicable to the position of the information display device as an output mode for the information acquired in the step of acquiring the information, based on the position information acquired in the step of acquiring position information;

converting the information acquired in the step of acquiring the information, based on the output mode determined in the step of determining; and outputting the information converted in the step of converting based on the output mode determined in the step of determining.

9. A non-transitory computer readable medium storing a control program for controlling a transportable information display device displaying information, the control program being executed to instruct a computer to achieve functions of:

acquiring the information comprising tire information relating to a tire mounted on a vehicle;

acquiring position information indicating a position of the information display device;

determining a display mode complying with laws and regulations applicable to the position of the information display device as an output mode for the information acquired by the acquiring the information, based on the position information acquired by the acquiring position information;

converting the information acquired by the acquiring the information, based on the output mode determined by the determining; and outputting the information converted by the converting based on the output mode determined by the determining.

10. The information display device according to claim 3, wherein the information acquisition unit is configured to acquire information relating to a position by short-range radio communication from another device, the position acquisition unit is configured to define the information relating to a position acquired by the information acquisition unit as the position information, and the position acquisition unit is configured to acquire the position information as long as the information acquisition unit is unable to acquire the information relating to a position.

11. The information display device according to claim 10, further comprising:

an operating language storage unit configured to store operating language information established in the information display device as a language used for operation of the information display device, wherein when the position acquisition unit is unable to acquire the position information, the determination unit is configured to determine the output mode of the tire information acquired by the information acquisition unit based on a storage content of the operating language storage unit.

12. The information display device according to claim 11, configured to determine whether initial setting of the information display device has been performed; wherein when initial setting of the information display device has not been performed, a user operation of the information display device is allowed to establish the position information; and when initial setting of the information display device has already been performed, a user operation of the information display device is not allowed to establish the position information.

13. A transportable information display device displaying information, comprising:

an information acquisition unit acquiring the information;

a position acquisition unit acquiring position information indicating a position of the information display device;

a determination unit determining an output mode for the information acquired by the information acquisition unit based on the position information acquired by the position acquisition unit;

a conversion unit converting the information acquired by the information acquisition unit based on the output mode determined by the determination unit; and an output unit outputting the information converted by the conversion unit based on the output mode determined by the determination unit;

the determination unit determining, as the output mode, a display mode complying with laws and regulations applicable to the position of the information display device, based on the position information, wherein the position acquisition unit is configured to define information relating to a position to be acquired by the information acquisition unit as the position information, the information acquisition unit is configured to acquire the information relating to the position by short-range radio communication from another device, and the position acquisition unit is configured to define the position information when the information acquisition unit is unable to acquire the information relating to the position.

14. A transportable information display device displaying information, comprising:

an information acquisition unit acquiring the information;

a position acquisition unit acquiring position information indicating a position of the information display device;

a determination unit determining an output mode for the information acquired by the information acquisition unit based on the position information acquired by the position acquisition unit;

a conversion unit converting the information acquired by the information acquisition unit based on the output mode determined by the determination unit;

an output unit outputting the information converted by the conversion unit based on the output mode determined by the determination unit; and an operating language storage unit configured to store operating language information established in the information display device as a language used for operation of the information display device;

the determination unit determining, as the output mode, a display mode complying with laws and regulations applicable to the position of the information display device, based on the position information, wherein when the position acquisition unit is unable to acquire the position information, the determination unit is configured to determine the output mode of the tire information acquired by the information acquisition unit based on a storage content of the operating language storage unit.

15. A transportable information display device displaying information, comprising:

an information acquisition unit acquiring the information;

a position acquisition unit acquiring position information indicating a position of the information display device;

a determination unit determining an output mode for the information acquired by the information acquisition unit based on the position information acquired by the position acquisition unit;

a conversion unit converting the information acquired by the information acquisition unit based on the output mode determined by the determination unit;

an output unit outputting the information converted by the conversion unit based on the output mode determined by the determination unit; and the determination unit determining, as the output mode, a display mode complying with laws and regulations applicable to the position of the information display device, based on the position information; and configured to determine whether initial setting of the information display device has been performed; wherein when initial setting of the information display device has not been performed, a user operation of the information display device is allowed to establish the position information; and when initial setting of the information display device has already been performed, a user operation of the information display device is not allowed to establish the position information.

* * * * *